US012624581B2

(12) United States Patent　　(10) Patent No.:　US 12,624,581 B2

Renard　　(45) Date of Patent:　May 12, 2026

(54) HOOK LATCH FOR AIRCRAFT NACELLE COWLS

(71) Applicant: LISI AEROSPACE, Paris (FR)

(72) Inventor: Laurent Renard, Vierzon (FR)

(73) Assignee: LISI AEROSPACE, Paris (FR)

( * ) Notice: Subject to any disclaimer, the term of this patent is extended or adjusted under 35 U.S.C. 154(b) by 9 days.

(21) Appl. No.: 18/733,402

(22) Filed: Jun. 4, 2024

(65) Prior Publication Data

US 2024/0401385 A1　　Dec. 5, 2024

(30) Foreign Application Priority Data

Jun. 5, 2023　(FR) ...................................... 2305633

(51) Int. Cl.
| | |
|---|---|
| *E05C 19/14* | (2006.01) |
| *B64D 29/06* | (2006.01) |
| *E05C 5/02* | (2006.01) |

(52) U.S. Cl.
CPC ................ *E05C 5/02* (2013.01); *B64D 29/06* (2013.01)

(58) Field of Classification Search
CPC ......... Y10T 292/0911; Y10T 292/0949; Y10T 292/216; E05C 19/14; B64D 29/06
See application file for complete search history.

(56) References Cited

U.S. PATENT DOCUMENTS

| | | | |
|---|---|---|---|
| 584,382 A | 6/1897 | Luraschi | |
| 2,703,431 A * | 3/1955 | Tatom ..................... | B64D 29/06 |
| | | | 292/DIG. 31 |
| 2,873,495 A * | 2/1959 | Love ..................... | E05C 19/145 |
| | | | 292/DIG. 31 |
| 2,945,274 A * | 7/1960 | Paterson ............... | E05C 19/145 |
| | | | 24/270 |
| 3,259,411 A | 7/1966 | Griffiths | |
| 4,531,769 A | 7/1985 | Glancy | |
| 4,538,843 A | 9/1985 | Haris | |
| 5,620,212 A * | 4/1997 | Bourne ................. | E05C 19/145 |
| | | | 292/DIG. 31 |
| 5,984,382 A | 11/1999 | Bourne | |

(Continued)

FOREIGN PATENT DOCUMENTS

| | | |
|---|---|---|
| DE | 682872 | 10/1939 |
| EP | 2914793 | 5/2014 |

(Continued)

OTHER PUBLICATIONS

Rusanu, Irina, Preliminary Search Report, Dec. 5, 2023, 2 pages, National Institute of Industrial Property, Courbevoie, France.

*Primary Examiner* — Carlos Lugo

(74) *Attorney, Agent, or Firm* — Henricks Slavin LLP

(57)　　　　ABSTRACT

A latch (22) includes a bracket (54) able to be attached to a first cowl; a hooking arm (58) comprising a hook (94) able to cooperate with a keeper (36) attached to a second cowl; a first handle (60) and a second handle (64) rotatable relative to the bracket, the first and second handles being configured so that the second handle (64) in a closed configuration blocks the first handle (60) in a closed configuration. In the closed configuration of the second handle (64), a shape of the second handle is fitted in a counter-shape (106) of the first handle (60) so as to block the first handle (60) in the closed configuration.

11 Claims, 3 Drawing Sheets

(56)                    References Cited

U.S. PATENT DOCUMENTS

| | | | | |
|---|---|---|---|---|
| 7,066,501 | B2 * | 6/2006 | Meineke ................ | B64D 29/06 |
| | | | | 244/129.4 |
| 7,461,871 | B2 * | 12/2008 | Vauchel ................ | E05C 19/145 |
| | | | | 292/DIG. 31 |
| 7,540,364 | B2 * | 6/2009 | Sanderson ......... | A45C 13/1084 |
| | | | | 190/119 |
| 10,173,782 | B2 * | 1/2019 | Hernandez ............ | E05C 19/145 |
| 12,326,021 | B2 * | 6/2025 | Renard .................. | B64D 29/06 |
| 2008/0129056 | A1 * | 6/2008 | Hernandez .............. | E05C 19/14 |
| | | | | 292/121 |

FOREIGN PATENT DOCUMENTS

| | | | | |
|---|---|---|---|---|
| FR | 981093 | A | * | 5/1951 |
| FR | 2261396 | A | * | 2/1975 |
| RU | 2099252 | C1 | * | 12/1997 |
| SU | 925015 | A1 | * | 10/1986 |

* cited by examiner

HOOK LATCH FOR AIRCRAFT NACELLE COWLS

SUMMARY

The present invention concerns a latch for assembling a first and a second structural element, of the type comprising: a bracket able to be attached to the first cowl; a hooking arm comprising a hook able to cooperate with a keeper attached to the second cowl; a first handle rotatable relative to the bracket, between a first open configuration and a first closed configuration; a second handle rotatable relative to the bracket, between a second open configuration and a second closed configuration; the first and second handles being configured so that in the second closed configuration, the second handle blocks the first handle in the first closed configuration.

The invention is particularly applicable to aircraft nacelle cowl latches. Such a latch is known in particular from document U.S. Pat. No. 5,984,382.

Latches are generally positioned under the nacelle. Such a position makes it difficult to access said latches.

The purpose of the present invention is to provide a latch that is suitable for nacelle cowls and which offers easier access and improved ergonomics compared with known solutions.

To this end, the subject of the invention is a latch of the aforementioned type, in which, in the second closed configuration of the second handle, a shape of the second handle is fitted in a complementary shape of the first handle so as to block the first handle in the first closed configuration.

Among other advantageous aspects of the invention, the latch comprises one or more of the following features, taken individually or in accordance with all technically possible combinations:

The two handles form a continuous surface in the first and second closed configurations;

The bracket forms a housing, the latch further comprising a sliding body housed in the housing, the sliding body being movable in translation relative to the bracket, between a first and a second axial position, the hooking arm being hinged to a first end of the sliding body;

The sliding body comprises an oblong through-hole, extending between a first end and a second end; the first handle rotates around a support rod attached to the first cowl, said rod being positioned in the oblong through-hole; in the first closed configuration of the first handle, the first end of the through-hole is close to the support rod; and in the first open configuration of the first handle, the second end of the through-hole is close to the support rod;

The latch further comprises a connecting rod mechanism comprising at least a first and a second connecting rod, the first connecting rod being hinged to the support rod and to the first handle, the second connecting rod being hinged to the first connecting rod and to a second end of the sliding body;

The first handle comprises a first trigger able to hook a first rod connected to the first cowl;

The second handle comprises a second trigger able to hook a second rod provided on the bracket.

The invention further relates to a latch assembly for assembling a first and a second cowl, said assembly comprising: a latch as described above; a keeper able to be attached to the second cowl and to cooperate with the hook of the latch's hooking arm; and a support rod able to be attached to the first cowl.

Among other beneficial aspects of the invention, the latch assembly comprises one or more of the following features, taken individually or in accordance with all technically possible combinations:

The latch assembly further comprises a support element, able to be attached to the first cowl, said support element comprising a first rod able to cooperate with the first trigger of the first handle to maintain the first handle in the first closed configuration;

The support element comprises a rotatable spreader beam and a shaft, said shaft being connected on the one hand to the spreader beam, and able to be connected, on the other hand to the second handle of the latch, so that rotation of the second handle causes rotation of the spreader beam.

The invention further relates to an aircraft nacelle comprising a first and a second cowl and a latch assembly as described above, wherein the latch and the support element are attached close to a lower edge of the first cowl; the nacelle further comprising a telescopic device attached close to upper edges of said cowls; and a linking device linking the support element to the telescopic device, such that a rotation of the second handle activates a locked or unlocked configuration of the telescopic device.

BRIEF DESCRIPTION OF THE DRAWINGS

The invention will become clearer upon reading the following description, which is provided solely as a non-limiting example, and with reference to the drawings, in which.

DESCRIPTION

Figure 1:
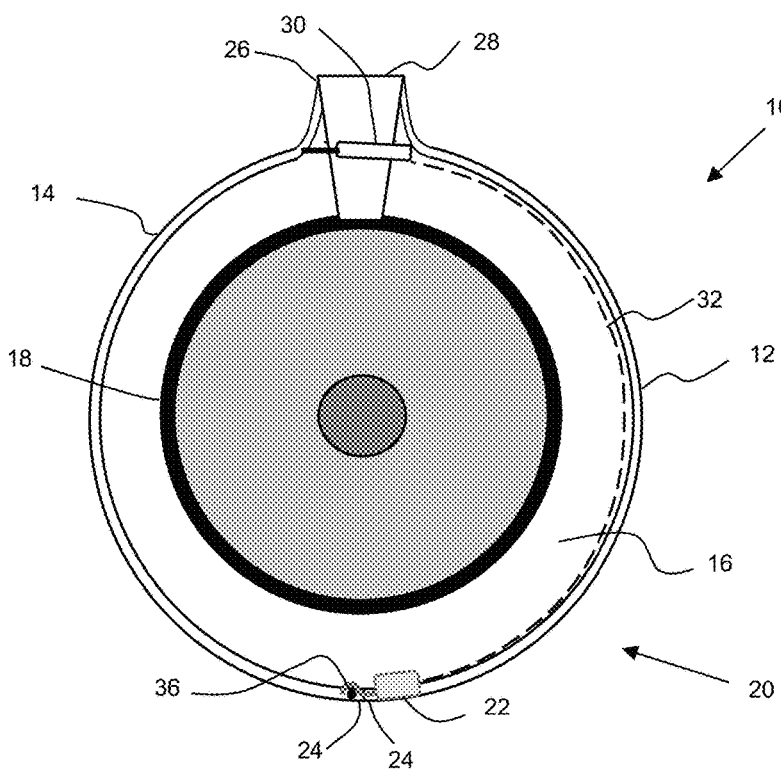
FIG. 1 is a schematic representation of an aircraft nacelle, according to a particular embodiment.

FIG. 1 shows an aircraft nacelle 10, comprising a first cowl 12 and a second cowl 14 delimiting an interior compartment 16, housing an engine 18, and a latch assembly 20. Said latch assembly 20 notably includes a latch 22 according to one embodiment of the invention. These elements are shown schematically in FIG. 1.

In the configuration shown in FIG. 1, the compartment 16 is closed. The lower edges 24 of the cowls 12, 14 are joined together by at least one latch assembly 20.

The upper edges 26 of each of the cowls are connected to an engine pylon 28 and can each rotate around a separate axis of rotation. The upper edges 26 of the cowls are connected by a lockable telescopic device 30, used to maintain the cowls in the closed position in flight. Such a telescopic device is described, for example, in document EP2914793.

In the particular embodiment shown, the nacelle comprises a linking device 32, described later, between the latch 22 and the telescopic device 30.

Each cowl comprises an outer face oriented towards the outside of the nacelle, and an inner face oriented towards the compartment 16. In the embodiment shown, the outer face of each of the cowl has a smooth, domed profile.

In the remainder of the description, we consider an orthonormal basis (X, Y, Z) associated with the latch 22. The X direction corresponds to the longitudinal direction, the Y direction to the transverse direction, and the Z direction to the normal direction.

Figure 2:
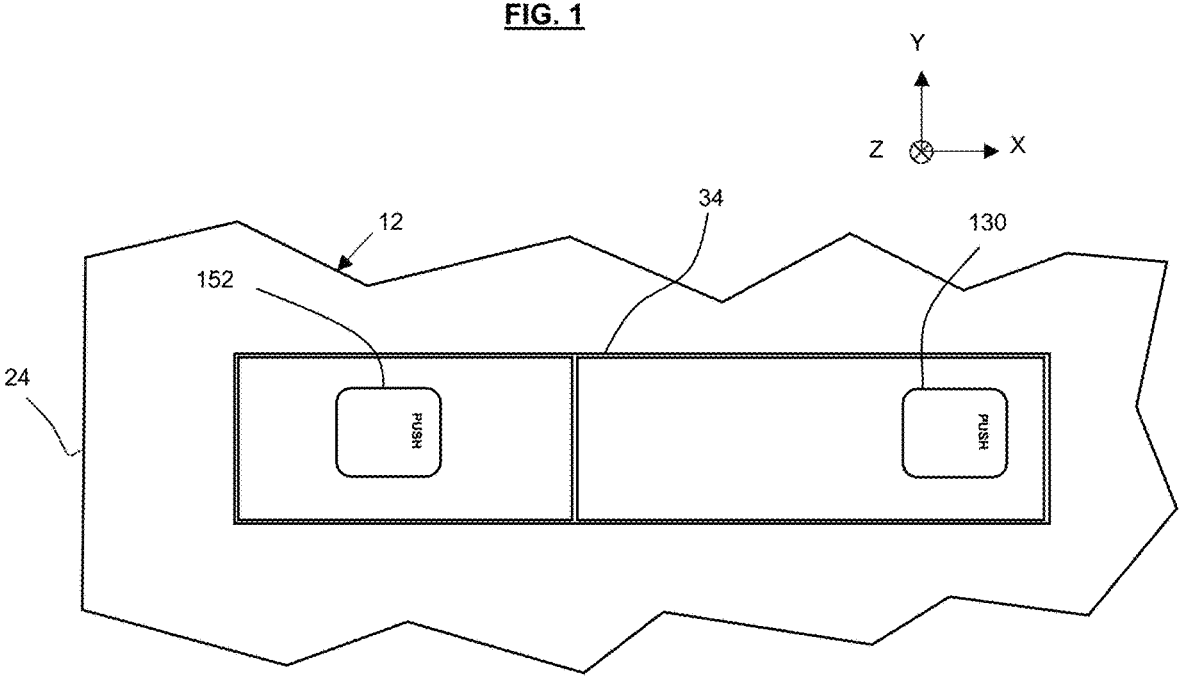
FIG. 2 is a detailed view, from below, of the nacelle in FIG. 1, comprising a latch according to one embodiment of the invention in a first position.

As shown in FIG. 2, the first cowl 12 has an elongated through-opening 34. The opening 34 has a closed contour and is positioned close to a lower edge 24 of the first cowl 12. The latch 22 is attached to the first cowl 12 so that its two handles 60 and 64, which will be described below, are contained in the opening 34 and accessible to an operator from outside the nacelle 10.

Figure 3:
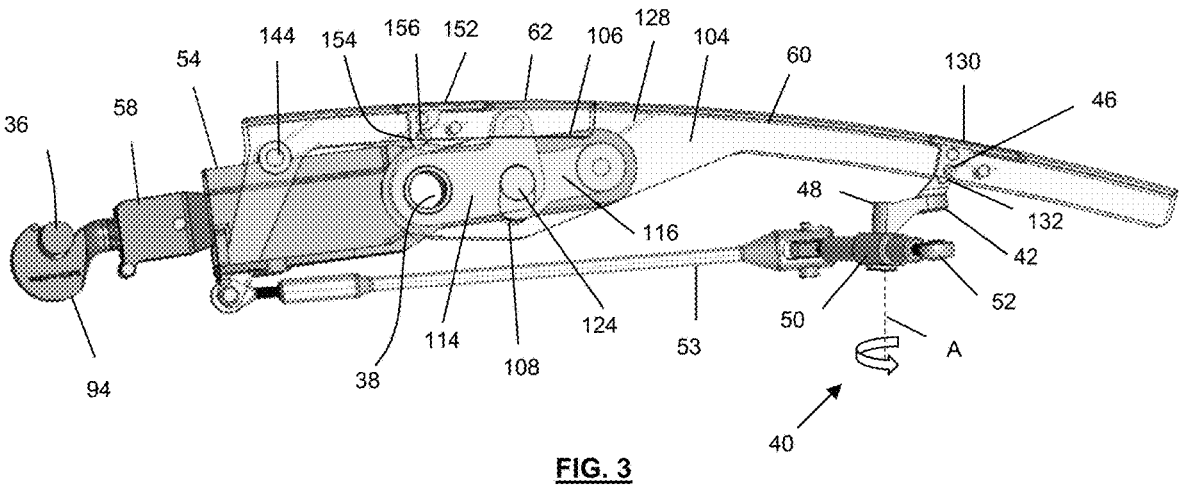
FIG. 3 is a side view of a latch assembly and the latch according to one embodiment of the invention, said latch being in the first position.
Figure 4:
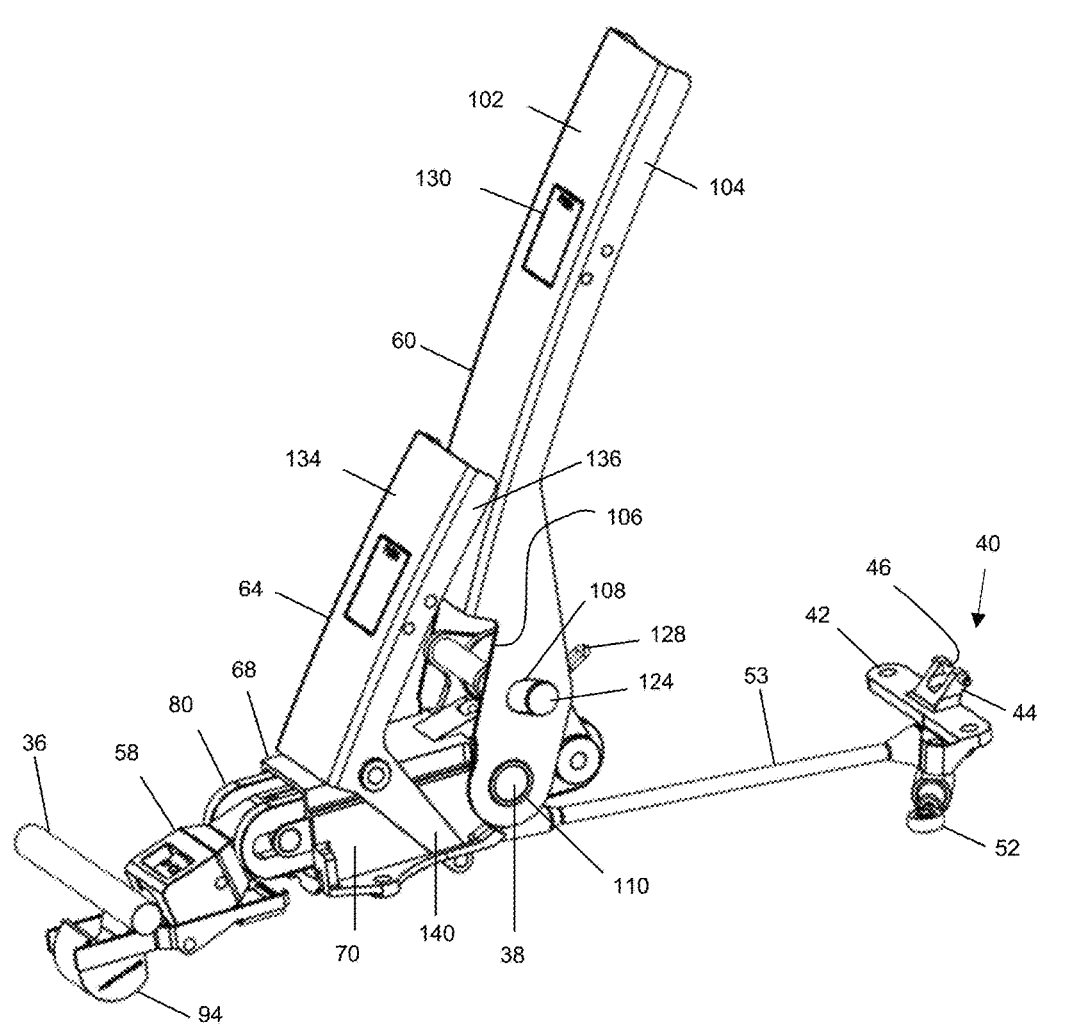
FIG. 4 is an isometric view of the latch assembly and the latch in FIG. 3, said latch being in a second position.

The latch assembly 20 can be seen in FIGS. 3 and 4. In particular, the latch assembly 20 comprises: the latch 22, described in detail later; a keeper 36; a support rod 38 and a support element 40.

The keeper 36 is attached to the inside of the second cowl 14, close to its lower edge.

The support rod 38 is attached to the inside of the first cowl 12, for example between two structural elements (not shown) positioned on the inner face of the first cowl 12.

The support element 40 is attached to the inside of the first cowl 12, on either side of the through-opening 34, by means of attachments (not shown) passing through the holes provided on a support plate 42. The support element 40 is thus positioned in the compartment 16. A first portion 44 projecting from a surface of the plate 42, oriented towards the through-opening 34, comprises a first rod 46. A second portion 48 projecting from an opposite surface of the plate 42, oriented towards the inside of the compartment 16, comprises a spreader beam 50, rotatable around an axis A substantially normal to the inner face of the first cowl. The spreader beam has an eye 52 at each end. The support element 40 also comprises a shaft 53 connected on the one hand to one of the eyes 52 of the spreader beam 50, and on the other hand to the latch, as will be described later.

The latch 22, shown in FIGS. 3 to 6, comprises: a bracket 54; a sliding body 56; a hooking arm 58; a first handle 60; a connecting rod mechanism 62 and a second handle 64.

The bracket 54 extends in a longitudinal direction, parallel to the X axis, and comprises: an upper plate 66 and a lower plate 68, extending substantially in planes (X, Y); and two side plates 70, extending substantially in planes (X, Z).

The upper plate 66 has means 72 for assembly to the first cowl 12, such as attachment holes. The upper 66, lower 68 and side plates 70 form a substantially parallelepiped-shaped housing 72, extending in the longitudinal direction between two open ends.

The side plates 70 form an axial projection 74 relative to one of the ends of the housing 72. At said axial projection, each side plate 70 has a hole with a closed contour.

Figure 6:
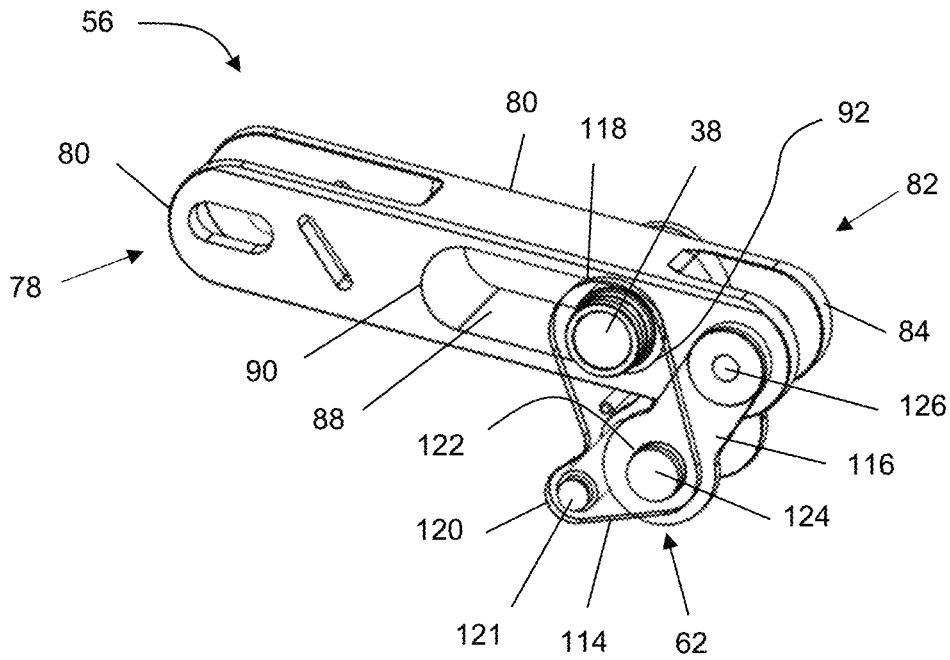
FIG. 6 is an isometric view of some elements of the latch in FIG. 5.

The sliding body 56, shown in FIG. 6, is in the form of a substantially parallelepiped block, one end 78 of which has two parallel first lugs 80. Similarly, a second end 82 has two parallel second lugs 84.

Each first 80 and second 84 lug is substantially flat and extends in a plane (X, Z). The first 80 and second 84 lugs are spaced apart from each other in the transverse direction, along the Y axis.

The central portion 86 of the sliding body extends axially between the two ends 78, 82 and comprises an oblong through-hole 88, extending in the longitudinal direction. The hole 88 has a first 90 and a second 92 closed end. The oblong through-hole accommodates a portion of the support rod 38, extending in the transverse direction.

The latch 22 is thus rotationally fixed around the transverse axis, on the one hand by the attachment of the bracket 54 to the first cowl 12, and on the other hand by the support rod 38 positioned in the oblong through-hole 88. The sliding body 56 is, however, movable in translation in the longitudinal direction in the housing 72 of the bracket 54, over a stroke defined by the length between the closed ends 90, 92 of the oblong through-hole.

The hooking arm 58 comprises a first end fitted with a hook 94. The opposite end of the hooking arm 58 is connected to the first lugs 80 of the sliding body 56 by means of a rivet passing through said end and the first lugs 80. The hooking arm is rotatable relative to the sliding body 56 around the rivet, i.e. around an axis extending in the through direction.

The hook 94 is configured to cooperate with the keeper 36 to keep the compartment 16 closed. More specifically, in the first so-called closed position of the latch 22, shown in FIGS. 2 and 3, the hook 94 grips the keeper 36. In the second so-called open position of the latch 22, shown in FIGS. 4 and 5, the hook 94 is at a distance from the keeper 36, allowing the cowls to open.

The first handle 60 is connected to the sliding body, and is rotatable relative to said sliding body 56, around the support rod 38. The first handle is shown in transparency in FIG. 5.

The first handle 60 has a substantially U-shaped cross-section and comprises: a first web plate 102 and two first edges 104 extending from the web plate 102. Each first edge 104 comprises a notch 106, an oblong bore 108 and a circular bore 110 to accommodate the support rod 38.

Figure 5:
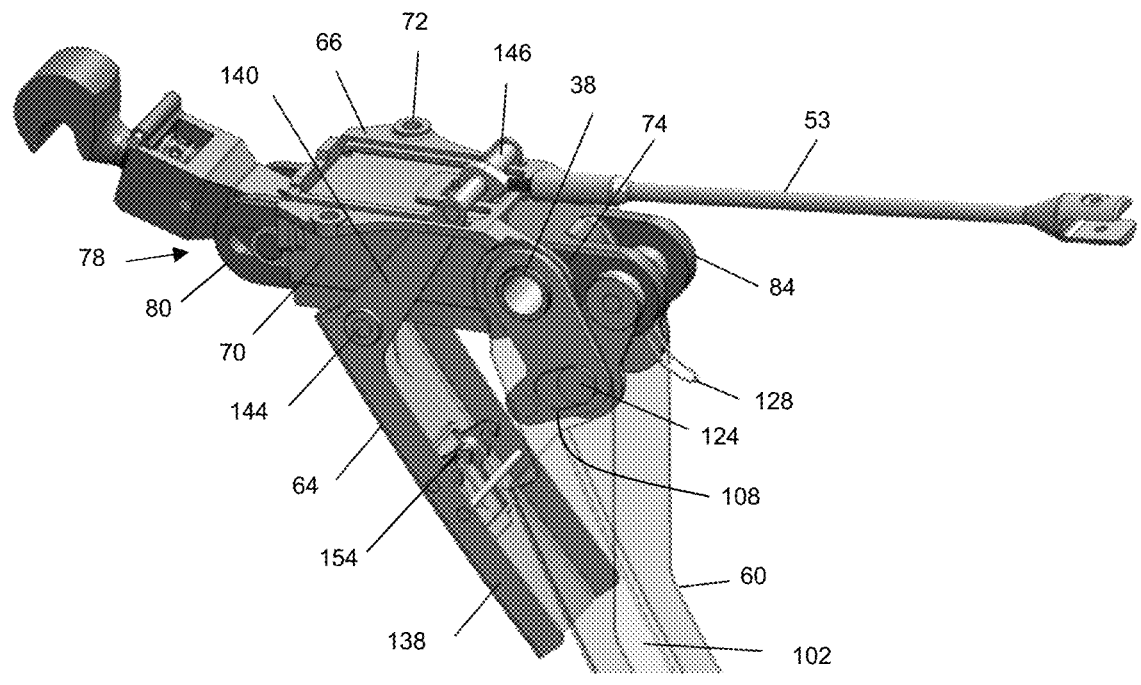
FIG. 5 is an isometric view of the inverted latch in FIG. 4.

The first handle 60 is rotatable between a first closed configuration, shown in transparency in FIGS. 2 and 3, and a first open configuration, shown in FIG. 4 and in transparency in FIG. 5.

The first handle 60 is also linked to the connecting rod mechanism 62, shown in FIGS. 3, 5 and 6.

The connecting rod mechanism 62 comprises two identical assemblies, symmetrically positioned on either side of the sliding body 56.

Each assembly comprises a first 114 and a second 116 connecting rod. Each first connecting rod 114 (a solid element illustrated as transparent in FIG. 6 for ease of viewing other components) is L-shaped and comprises a first end 118 and a second 120 end, and a central joint 122.

The first end 118 has a circular opening to accommodate a portion of the support rod 38. Thus, the first ends 118 of the first connecting rods 114 are secured by the support rod 38, while being free to pivot about said support rod 38. The second ends 120 of the first connecting rods are connected by an axle 121.

A spur 124 provided on a first end of the second connecting rod 116 passes through the central joint 122 of the first connecting rod 114 and the oblong bore 108 of the first handle. The spur 124 thus connects the second connecting rod 118 to the first connecting rod 114 and to the first handle 60.

A pin 126 extends between the second ends of the second connecting rods 116 and the second lugs 84 of the sliding body, allowing rotation of the second connecting rods 116 around the pin.

The connecting rod mechanism 62 also includes a torsion spring 128, wound around the pin 126.

The support rod 38 attached to the first cowl 12 therefore passes transversely through the first edges 104 of the first handle 60, the holes in the side plates 70 of the bracket 54 and the first connecting rods 114 of the connecting rod mechanism 62.

In the first closed configuration of the first handle 36, shown in FIG. 3, the sliding body 56 is in a first axial position relative to the bracket 54. More specifically, in said first axial position, the sliding body is positioned so that the first end 90 of the through-hole 88 comes into contact with the support rod 38. In this position, the spur 124 of each assembly 112 is close to a first end of the oblong bore 108 of the first handle 60, and an arm of the torsion spring 128 is in contact with the web plate 102 of the first handle 60. The spring 128 exerts a pushing force on the first handle, tending to move the first handle to the open position.

In the first open configuration of the first handle 60, shown in FIGS. 4 and 5, the sliding body 56 is in a second axial position relative to the bracket 54. More specifically, in said second axial position, the sliding body is positioned so that the second end 92 of the through-hole 88 is close to the support rod 38. In this position, the spur 124 of each assembly 112 is close to a second end of the oblong bore 108 of the first handle 60 and the torsion spring 128 no longer comes into contact with the first handle 60.

The first handle 60 also includes a first trigger 130 fitted with first hooks 132. The first trigger 130 is able to pivot relative to the first handle. As shown in FIG. 3, the first hooks 132 are able to grip the first rod 46 of the support element 40 to maintain the first handle 60 in the first closed configuration.

The second handle 64 is hinged to the bracket 54. The second handle 64 has a substantially U-shaped cross-section and comprises: a second, substantially elongated web plate 134; and two second edges 136 extending from the second web plate 134.

Each second edge 136 is substantially L-shaped and comprises: a first arm 138, running substantially alongside the second web plate 132; and a second arm 140, extending from the first arm.

A second pin 144, positioned at the intersection of the arms 138 and 140, connects the second edges 136 to the lower plate 68 of the bracket 54. The second handle 64 is thus rotatable relative to the bracket 54 about a transverse axis parallel to the Y axis represented by the second pin 144.

A linking arm 146 connects the ends of the second arms 140 of the second handle. The shaft 53 of the support element 40 is connected to the linking arm 146.

The previously described linking device 32 connects the support element 40 to the previously mentioned telescopic device 30. The linking device 32 comprises, for example, a cable attached to the other of the two eyes 52 of the spreader beam and to the telescopic device 30. The linking device 32 is able to switch the telescopic device 30 between an activated latch configuration and a deactivated latch configuration.

The second handle 64 is rotatable between a second closed configuration, shown in FIGS. 1, 2 and 3, and a second open configuration, shown in FIGS. 4 and 5.

As shown in FIG. 3, in the second closed configuration of the second handle 64, the first arm 138 of each second edge 136 is fitted in the notch 106 of one of the first edges 104 of the first handle 60. Thus, through a shape and complementary shape system on the two handles, the first handle 60 is blocked in the first closed configuration when the second handle 64 is in the second closed configuration. Other configurations of shapes and counter-shapes than those shown can be provided on both handles.

Furthermore, in the second closed configuration of the second handle 64, the outer faces of both handles 60, 64 form a smooth, continuous surface, fitting into the closed contour of the through-opening 34 of the first cowl 12. Thus, in the closed position of the latch 22, shown in FIGS. 1 to 3, the first cowl 12 has a substantially continuous, smooth outer surface.

Furthermore, in the second closed configuration of the second handle 64, the free ends of the second arms 140 are in a first axial position tending to pull the shaft 53 towards the hook 94, and thus bring the telescopic device 30 into an activated latch configuration.

In the second open configuration of the second handle 64, shown in FIG. 4, the second edges 136 are moved away from the first edges 104 of the first handle 60. The second open configuration of the second handle 64 thus enables the first handle 60 to be rotated relative to the bracket 54.

Furthermore, in the second open configuration of the second handle 64, through the effect of rotation of the handle 64 about the bracket 54, the free ends of the second arms 140 are in a second axial position tending to push the shaft 53 away from the hook 94, and thus bring the telescopic device 30 into a deactivated latch configuration.

The second handle 64 also comprises a second trigger 152 comprising second hooks 154, able to grip a second rod 156, integral with the lower plate 68 of the bracket, in order to maintain said second handle in said second closed configuration.

An operating procedure for the latch assembly 20 will now be described.

It is assumed that, in an initial state, the compartment 16 is closed and the cowls 12, 14 and the latch 22 are in the position shown in FIGS. 1-3.

First, an operator presses the second trigger 152 to open the second handle 64, which rotates around the second pin 144. The free ends of the second handle rotate clockwise and thus move from the first to the second axial position. The telescopic device 30 is unlocked by the linking arm 146 pushing the shaft 53 and activating the rotation of the spreader beam 50 about the A axis.

The operator then presses the first trigger 130 to open the first handle 60, which then pivots around the support rod 38. The sliding body 56 then moves longitudinally relative to the bracket 54, causing the hooking arm 58 to pivot relative to the bracket. The hook 94 thus moves away from the keeper 36.

The latch 22 is then in the second position shown in FIGS. 4 and 5. Since the hook 94 is no longer held by the keeper 36, the upper edges 26 of the cowls 12, 14 can be moved apart by a mechanism not shown, such as a hydraulic cylinder, activated by the operator. The compartment 16 is thus open, allowing an operation to be carried out on the engine 18.

At the end of said operation, the cowls 12, 14 are folded back by the operator by means of said mechanism. The telescopic device 30 is folded away. The first handle 60 is then closed by the operator. In a reverse procedure to that described above, the hooking arm 94 pivots in the direction of the second cowl 14 and the sliding body 56 moves longitudinally, so as to enable the hook 94 to grip the keeper 36 to bring the lower edges of the cowls 12, 14 together.

Coming into contact with the first rod 46 of the support element, the first hooks 132 of the first trigger 128 grip said rod, holding the first handle 60 in the first closed position. The latch 22 is thus locked.

The operator then closes the second handle 64, which fits into the first handle 60. The linking device 32 is thus actuated, locking the telescopic device 30 in the closed position.

Coming into contact with the second rod 156, the second hooks 154 grip said rod, keeping the second handle closed. The telescopic device 30 is thus locked.

The latch 22 described above is easy to use and ergonomic for an operator. The latch 22 enables the telescopic device 30 to be activated by means of a single latch, thus reducing the weight and complexity of the mechanism. The aerodynamic drag associated with the presence of such latches is also reduced.

In addition, the double handle system described above makes it possible to secure the order of actuation of the latch 22 and the telescopic device 30, and in particular to ensure that the latch 22 is locked, and that the cowls are effectively closed, before locking the telescopic device 30.

This is because any attempt to lock the telescopic device 30 before the latch 22 has been locked could lead to said telescopic device breaking when the cowls are brought together, and/or lead to said telescopic device possibly not being locked, implying, in both cases, a risk of the cowls opening at the top in flight under high stress.

Finally, the operator must open the second handle 64, therefore actuate the unlocking of the telescopic device 30, in order to be able to open the first handle 60, i.e. to be able to open the latch 22. This is because the first handle 60 cannot open before the second handle 64, even if the operator presses the first trigger 130, as the fitting of the second handle in the notch 106 of the first handle blocks the rotation of the first handle 60.

However, the invention is not limited to the embodiment described above. Thus, the opening 34 can be closed by a hatch, and the latch can be set back from the hatch in the direction normal to the hatch, so that the handles are only accessible once the hatch is open.

What is claimed:

1. A latch for assembling a first nacelle cowl with a first cowl outer face and a second nacelle cowl with a second cowl outer face, said latch comprising:
   a bracket configured to be attached to the first cowl;
   a hooking arm including a hook configured to cooperate with a keeper attached to the second cowl;
   a first handle, rotatable relative to the bracket between a first open configuration and a first closed configuration, that includes a first handle plate with an outer face that forms a continuous outer face with first cowl outer face when the first handle is in the first closed configuration and a first trigger that pivots relative to the first handle plate; and
   a second handle, rotatable relative to the bracket between a second open configuration and a second closed configuration, that includes a second handle plate with an outer face that forms a continuous outer face with first cowl outer face when the second handle is in the second closed configuration and a second trigger that pivots relative to the second handle plate,
   wherein
   the first handle has first and second longitudinal end portions and the first longitudinal end portion defines a first shape,
   the second handle has first and second longitudinal end portions and the second longitudinal end portion defines a second shape that is complimentary to the first shape of the first handle first longitudinal end portion, and the first longitudinal end portion of the first handle and the second longitudinal end portion of the second handle are complimentarily engaged with one another, thereby blocking the first handle from moving from the first closed configuration to the first open configuration when the first handle is in the first closed configuration and the second handle is in the second closed configuration.

2. The latch according to claim 1, in which the outer faces of the first and second handles together form a continuous surface when the first and second handles are in the first and second closed configurations.

3. The latch according to claim 1, wherein
   the bracket forms a housing,
   the latch further comprises a sliding body housed in the housing and movable in translation relative to the bracket between a first axial position and a second axial position, and
   the hooking arm is hinged to a first end of the sliding body.

4. A latch assembly for assembling a first cowl and a second cowl, said assembly comprising:
   the latch according to claim 1;
   the keeper according to claim 1; and
   a support rod configured to be attached to the first cowl.

5. The latch assembly according to claim 4, further comprising
   a support element, configured to be attached to the first cowl, said support element comprising a first rod configured to cooperate with a first trigger of the first handle to maintain the first handle in the first closed configuration.

6. A latch assembly for assembling a first and a second cowl, said assembly comprising:
   a latch according to claim 1;
   a keeper according to claim 1;
   a support rod able to be attached to the first cowl;
   a support element, able to be attached to the first cowl, said support element comprising a first rod able to cooperate with a first trigger of the first handle to maintain the first handle in the first closed configuration;
   wherein the support element comprises a rotatable spreader beam and a shaft, said shaft being connected on the one hand to the spreader beam, and able to be connected, on the other hand, to the second handle of the latch, so that rotation of the second handle causes rotation of the spreader beam.

7. A nacelle, comprising:
   a first cowl;
   a second cowl; and
   a latch assembly according to claim 4, wherein the latch and the support element are attached close to a lower edge of the first cowl; the nacelle further comprising a telescopic device attached close to the upper edges of said cowls; and a linking device connecting the support element to the telescopic device, such that a rotation of the second handle activates a locked or unlocked configuration of the telescopic device.

8. A latch for assembling a first and a second nacelle cowl, said latch comprising:
   a bracket able to be attached to the first cowl;
   a hooking arm comprising a hook able to cooperate with a keeper attached to the second cowl;
   a first handle rotatable relative to the bracket, between a first open configuration and a first closed configuration;

a second handle rotatable relative to the bracket, between a second open configuration and a second closed configuration;

the first and second handles being configured so that, in the second closed configuration, the second handle blocks the first handle in the first closed configuration, the latch being characterized in that, in the second closed configuration of the second handle, a shape of the second handle is fitted in a complementary shape of the first handle so as to block the first handle in the first closed configuration;

wherein the bracket forms a housing, and the latch further comprises a sliding body housed in the housing, the sliding body being movable in translation relative to the bracket, between a first and a second axial position, the hooking arm being hinged to a first end of the sliding body;

wherein the sliding body comprises an oblong through-hole extending between a first end and a second end;

wherein the first handle rotates around a support rod attached to the first cowl, said rod being positioned in the oblong through-hole;

wherein in the first closed configuration of the first handle, the first end of the through-hole is adjacent to the support rod; and in the first open configuration of the first handle, the second end of the through-hole is close to the support rod.

9. The latch according to claim 8, further comprising a connecting rod mechanism comprising at least a first connecting rod and a second connecting rod, the first connecting rod being hinged to the support rod and to the first handle, and the second connecting rod being hinged to the first connecting rod and to a second end of the sliding body.

10. A latch for assembling a first nacelle cowl with a first cowl outer face and a second nacelle cowl with a second cowl outer face, said latch comprising:

a bracket configured to be attached to the first cowl;

a hooking arm including a hook configured to cooperate with a keeper attached to the second cowl;

a first handle, rotatable relative to the bracket between a first open configuration and a first closed configuration, that includes a first trigger and a first handle plate with an outer face that forms a continuous outer face with first cowl outer face when the first handle is in the first closed configuration, the first trigger being configured to hook a first rod connected to the first cowl; and a second handle, rotatable relative to the bracket between a second open configuration and a second closed configuration, that includes a second trigger and a second handle plate with an outer face that forms a continuous outer face with first cowl outer face when the second handle is in the second closed configuration, wherein the first handle has first and second longitudinal end portions and the first longitudinal end portion defines a first shape, the second handle has first and second longitudinal end portions and the second longitudinal end portion defines a second shape that is complimentary to the first shape of the first handle first longitudinal end portion, and the first longitudinal end portion of the first handle and the second longitudinal end portion of the second handle are complimentarily engaged with one another, thereby blocking the first handle from moving from the first closed configuration to the first open configuration when the first handle is in the first closed configuration and the second handle is in the second closed configuration.

11. The latch according to claim 10, wherein the second trigger is configured to hook a second rod provided on the bracket.

* * * * *